United States Patent [19]

Evans

[11] 4,274,226
[45] Jun. 23, 1981

[54] DETECTION OF OBJECT IN PATH OF MOVING GATE

[75] Inventor: Edward N. Evans, Long Beach, Calif.

[73] Assignee: Park Mobile, Inc., New York, N.Y.

[21] Appl. No.: 63,868

[22] Filed: Aug. 6, 1979

[51] Int. Cl.³ .................................... E05F 15/20
[52] U.S. Cl. ......................................... 49/25; 49/26; 340/552
[58] Field of Search .................. 49/25, 26, 28, 141; 340/552, 555; 246/379

[56] References Cited

U.S. PATENT DOCUMENTS

| | | | |
|---|---|---|---|
| 1,947,079 | 2/1934 | Ellis, Jr. | 49/25 X |
| 3,656,608 | 4/1972 | Lichti | 246/379 X |
| 3,742,434 | 6/1973 | Leyde et al. | 49/25 X |
| 3,852,592 | 12/1974 | Scoville et al. | 340/555 X |
| 3,877,002 | 4/1975 | Cheal et al. | 340/552 |
| 4,029,176 | 6/1977 | Mills | 49/25 X |

Primary Examiner—Philip C. Kannan
Attorney, Agent, or Firm—Larson, Taylor & Hinds

[57] ABSTRACT

Electromagnetic radiation object position detection system and method are disclosed for detecting when an object is located in the path of a powered sliding gate. In a preferred embodiment, polarized microwave radiation is emitted from a source fixed relative to the sliding gate. This radiation is projected along and spaced ahead of the leading edge of the sliding gate by a redirecting means which moves with the gate. A second redirecting means also moves with the gate and redirects the radiation back to a detector fixed relative to the sliding gate which provides a signal when this radiation is detected. The presence of an object in the path of the sliding gate is indicated by the blockage of radiation in the beam moving with the leading edge of the sliding gate.

16 Claims, 6 Drawing Figures

DETECTION OF OBJECT IN PATH OF MOVING GATE

FIELD OF THE INVENTION

This invention relates generally to the detection of an object positioned in the path of a sliding gate and more particularly relates to the use of emitted radiation to determine when an object is positioned in the path of the sliding gate.

BACKGROUND OF THE INVENTION

Systems for the detection of an object in the path of a powered sliding gate using electromagnetic radiation are conventional and are depicted in the prior art. These systems usually contain both a source and a detector, and the position of an object in the path of the gate is determined by the absence of a normally detected signal. Such systems typically use light radiation with the source emitting a beam of light which is detected by the detector. The presence of an object in the path of the sliding gate is indicated when the light beam is broken by the object coming between the source and detector. An example of such a photoelectric system in use with elevator or train doors is depicted in the U.S. Pat. No. 1,947,079 to Ellis. In this system, the beams are aimed horizontally across the doorway.

It is also known to use non-visible light electromagnetic radiation (such as infrared radiation), microwave radiation, and ultrasonic waves to determine the presence of an object in a particular area, especially by reflected signals. Representative patents for these types of devices include the following: U.S. Pat. No. 3,852,592 to Scoville et al (infrared radiation); U.S. Pat. No. 4,029,176 to Mills (ultrasonic waves); and U.S. Pat. No. 3,877,002 to Cheal et al (microwave radiation).

There are a number of disadvantages to each of the prior art systems when they are used to detect the presence of an object in the path of a sliding gate. A major problem concerns where to locate the source and the detector. One place to position the source and/or detector is on a part of the sliding gate itself but this creates a major problem because of the requirement that the detector must move with the gate. This movement requires that the electrical connections to the source and/or detector must be able to move as well and subjects the electronic circuits and the electrical connections between the gate and the frame to wear or breakage from the door vibrations and the continuous flexing. In addition, when used outside of an enclosed area, dirt, dust and water are stirred up by the movement of the gate, deposit on the various components of the system and eventually cause decreased performance and eventual malfunction of the system.

Another location disclosed in the prior art for the source and detector is where the radiation can travel parallel to the direction of movement of the sliding gate at a position just inside or outside of the gate. However, in order to monitor a large portion of the path of the gate, a multitude of sources and corresponding detectors are necessary. Even in such cases, unless the sources and detectors are very closely spaced and a large number used, it is still possible for the radiation beams to miss the people or objects sought to be detected. In addition, in those devices where the gate has to travel a long distance this type of system causes the gate to stop upon the detection of an object even when the object may not be in danger of being struck at that time or when the object is moving out of the path of the gate when sensed.

Another disadvantage of the prior art systems is their complexity. In order to detect the presence of an object in the path of a sliding door, the prior art systems use either a plurality of sources and detectors, or the source must sweep the plane in which the gate moves. Both types of systems are complex, costly, difficult to maintain, and subject to failure as a result.

Other systems have been used which detect the presence of an object adjacent to the plane of movement of the sliding gate. These systems assume that any object near enough to be detected may be near enough to be in the path of the sliding gate. This is, of course, only an assumption, and it may well be that an object which is just in range of the sensor is sufficiently clear of the path of the sliding gate so that the sliding gate need not be stopped. Such systems, therefore, also suffer from the disadvantage of having to stop the gate unnecessarily.

Therefore, it is believed that none of the known conventional systems provide a reliable and simple electromagnetic radiation detection system for detecting when an object is located in the path of a sliding gate. Furthermore, none of the conventional systems provide a source and detector which is usable outside of enclosed areas.

SUMMARY OF THE INVENTION

The present invention provides a novel apparatus and a novel method for determining when an object is located in the path of a powered sliding gate.

It is a feature of the present invention that the presence of an object in the path of a sliding gate is determined by the absence of reception of electromagnetic radiation by a detector. In addition, it is a feature of the present invention to use a source and detector which are fixed relative to the sliding gate, but which uses a beam that actually moves with and slightly ahead of the sliding gate.

It is also a feature of one embodiment of the present invention to use a microwave beam generation and detection system that can be interconnected with a microprocessor control system so that the radiation can be selectively generated and so that the reception or lack of reception of the detected signal can be properly interpreted. Obviously, such a microprocessor control system also can be used to coordinate other detection systems, such as systems for detecting the presence of people inside an area accessible through the sliding gate, or, for example, systems for detecting the failure to properly position or store an article inside that area.

In a particular embodiment of the present invention, a beam of polarized microwave radiation is transmitted from a source to a detector which can only detect radiation which is polarized. A source in a hollow waveguide leg and a detector in another hollow waveguide leg are positioned parallel to each other with a sliding gate between them. Moving with the gate, and located partially inside each leg, are beam redirecting means which project the microwave beam slightly in front of the leading edge of the sliding gate from one leg to the other leg. This beam is normally detected except when an object is in the path of the sliding gate and comes between the two beam redirecting means. This system has the inherent advantage of requiring only a few relatively simple parts. While the beam does move with the gate, the source and detector are stationary so there is no need for flexible cables and wires. Also, no duplication of the expensive parts of the system, such as the electromagnetic radiation source and detector and the associated electronics, is necessary. In addition, by using microwave radiation, a single, relatively large beam can cover the entire thickness of the sliding gate. Finally, microwave radiation has the advantage of immunity to environmental interference, such as smoke and wind, can be used outside of totally enclosed areas, can be propagated over relatively large distances, and can be easily maintained.

Other features, object, and advantages of the present invention are stated in or apparent from the presently preferred embodiments of the invention found hereinbelow.

DETAILED DESCRIPTION OF THE PREFERRED EMBODIMENT

Figure 1:
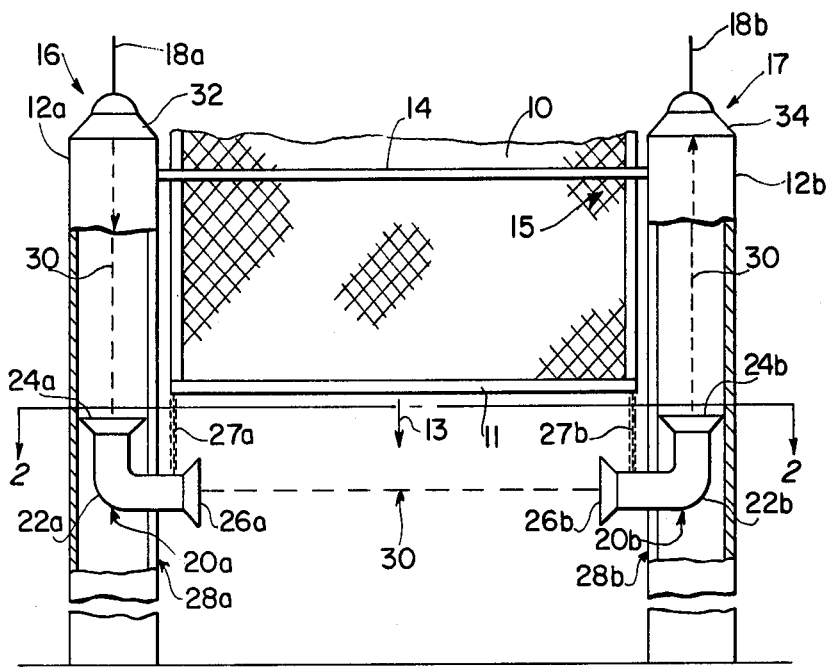
FIG. 1 is a schematic representation in partial section of a front elevational view of a sliding gate and object detection system.

With reference now to the drawings in which like numerals represent like elements throughout the several views, a presently preferred embodiment of the present invention is depicted in FIG. 1. A powered sliding gate 10 with a leading edge 11 is depicted in an intermediate position as it is being moved in the direction of arrow 13. Many different suitable devices which are well known in the art can be employed to drive sliding gate 10, such as electric, pneumatic, or hydraulic motors. Sliding gate 10 operates in and is supported by a frame 15 that includes two hollow, elongate legs 12 comprised of an electrically conductive metal, such as aluminum, positioned on each side of sliding gate 10. A cross member 14 connects legs 12 together near the top of sliding gate 10 when in its lowered position. It would also be possible to have a separate frame to support the movement of sliding gate 10 and to have hollow legs 12 in a similar position adjacent such a separate frame. The left leg as depicted in FIG. 1 is denoted 12a and the right leg 12b. The hollow cavity inside each leg 12 is used as a waveguide.

A source of electromagnetic radiation 16, such as microwaves, is fixedly mounted near the top of hollow leg 12a. Fixedly mounted near the top of hollow leg 12b is a detector 17 of the electromagnetic radiation emitted by source 16. Source 16 and detector 17 are in communication, respectively, with the cavity inside legs 12a and 12b. In the depicted embodiment in FIG. 1, where the electromagnetic radiation is microwaves, source 16 and detector 17 are mounted inside the corresponding leg 12. Coaxial wires 18a and 18b connect source 16 and detector 17, respectively, to the associated electronics as discussed hereinbelow.

Slidably mounted in the cavity of hollow legs 12 are two redirecting means 20a and 20b. When microwaves are used as the type of electromagnetic radiation, redirecting means 20 can simply be comprised of simple, 90° bend, hollow metal elbows 22a and 22b having conventional horns 24 and 26 integrally attached at each end of elbow 22 as depicted in FIG. 1. Redirecting means 20a and 20b are attached in some manner, such as with chains 27a and 27b, respectively, to corresponding sides of leading edge 11 of sliding gate 10. When chains are used as the attaching means, it is obvious that redirecting means 20 travel downwardly inside the corresponding leg as a result of gravity and are pulled upwardly therein with the corresponding chain. Obviously, positive linkage means, such as pipes, can be used to attach the redirecting means 20 to sliding gate 10 so that the downward movement thereof can be positively accomplished.

Figure 2:
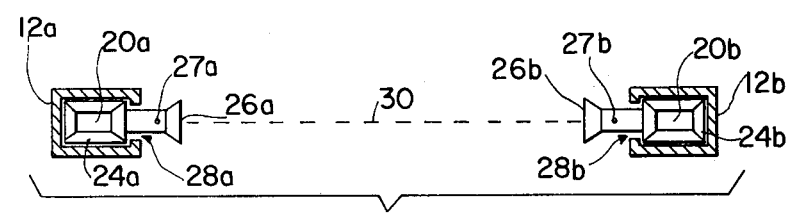
FIG. 2 is a cross-sectional view taken along line 2—2 of FIG. 1.

As shown in FIGS. 1 and 2, legs 12a and 12b have an open channel 28a and 28b on the inside, mutually facing surfaces thereof so that redirecting means 20a and 20b can extend mutually inwardly toward each other through the corresponding channel. The length of chains 21a and 21b can be adjusted to position the corresponding redirecting means 20a and 20b at any predetermined distance ahead of leading edge 11 as desired and so that redirecting means 20a and 20b can be aligned. A dashed line 30 indicates the path of travel of microwaves from source 16 to detector 17. If it is desired that leading edge 11 of sliding gate 10 engage the bottom surface of the entranceway between legs 12a and 12b, then obviously legs 12a and 12b must extend below the surface a distance at least equal to the distance between the bottom of horns 26a and 26b and sliding gate leading edge 11.

In the preferred embodiment, the microwaves transmitted from source 16 are polarized by a horn 32 in a manner well known in the art. Horn 32 preferably polarizes the microwaves with the electric field parallel to the open side of channel 28a of hollow leg 12a. Because relatively short distances are involved and because a high degree of accuracy is not required, the cavities inside legs 12 are used to couple the emitted microwave from horn 32 to the receiving horn 24a of redirecting means 20a. Similarly, a polarizing horn 34 is mounted just below and in communication with detector 17 in the channel of hollow leg 12b to receive the microwaves detected by horn 26b of redirecting means 20, and redirected thereby upwardly through the channel of hollow leg 12b.

Figure 3:
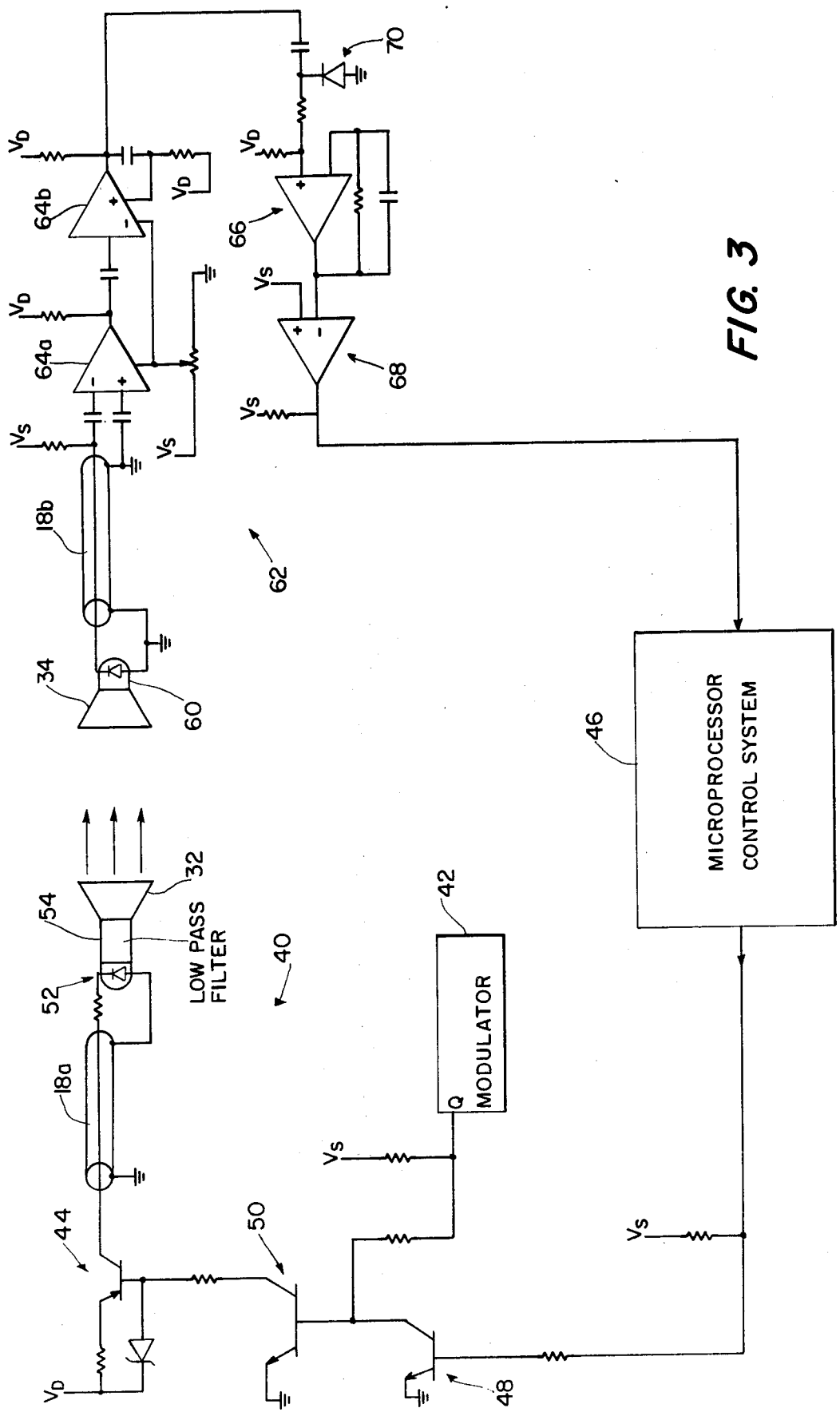
FIG. 3 is a schematic circuit diagram of a microprocessor controlled microwave transmission and detection system.

A microprocessor controlled system for generating and detecting microwaves which can be emitted by source 16 and detector 17 is depicted in FIG. 3. An impatt diode oscillator 40 is used to produce 50 milliwatts of 10 GHZ microwave radiation which is amplitude modulated by a modulator schematically shown at 42 by switching a constant current driver 44 on and off at a desired modulation frequency, an exemplary frequency being 5 KHz. Modulator 42 can simply be a properly wired IC (integrated circuit) No. 74123. An exemplary transistor driver that can be used for driver 44 is a 2N5415 type transistor. A microprocessor control system 46 is coupled in parallel with modulator 42 to driver 44 with grounded emitter, coupling transistors 48 and 50. Coupling transistors 48 and 50 can be, respectively, of the types 2N5172 and 2N3440. The output of driver 44 is connected to an impatt diode 52 which, when conducting current produces the desired microwave radiation. The output of impatt oscillator 40 is passed through a low pass filter 54 to eliminate the higher harmonics and then transmitted through horn 32, which can be a conventional 18 dB gain X-band horn, toward receiving horn 34 which can also be an 18 dB horn.

The use of a modulator in oscillator 40 has at least two purposes. First, a modulator makes the microwave beam much easier to detect because the band width of the receiver can be constructed around the modulated frequency, thereby reducing receiver noise levels. The second purpose is to permit easy isolation of a plurality of microwave beams in one system from those of a nearby system by simply using different modulation frequencies. High gain horns are used to reduce the necessary system power requirements and to eliminate interference between separate beams.

Receiver horn 34 has a crystal detector 60 mounted thereon. Crystal detector 60 is maintained at a slight positive bias with a receiver circuit 62 so as to provide maximum sensitivity. Receiver circuit 62 has approximately a 60 dB gain which can be internally adjusted and comprises a pair of dual operational amplifiers 64a and 64b with automatic gain control. Operational amplifiers 64a and 64b can be the conventional 757 DM type dual operational amplifier. From the output of operational amplifier 64b, the received signal is sent first through a current amplifier 66 (for example of the type MC3301P) and thence to an impedance matching amplifier 68 that has TTL output compatability (for example of the type MC3312P). Amplifiers 66 and 68 together with the depicted capacitors, resistors, and a diode 70 act as a Schmitt trigger to detect, filter and convert the received signal to a standard output TTL logic signal which is then fed to the microprocessor control system 46 to be decoded and interpreted.

If necessary, further isolation of the transmitted microwave beams from either the same system or a similar adjacent system can be obtained by using the microprocessor to either selectively generate microwave beams or to selectively sample the generated beams. Because the microwave system of FIG. 3 uses modulated microwave radiation, simply by using higher modulated frequencies, a greater number of beams can be simultaneously generated and sampled without interference occurring between the beams.

In operation, the object detection system functions in the following manner. Source 16 is caused to radiate polarized microwaves by microprocessor 46 in response to movement of sliding gate 10 in the direction shown. Microwave radiation enters hollow leg 12a from a standard X-band waveguide which propagates in the $TE_{10}$ mode. This mode has zero electric field at both sides of hollow leg 12a. When the radiation is transmitted to hollow leg 12a through horn 32, the field pattern or mode of transmission remains the same since horn 32 acts as an impedance matching device giving a smooth transistion between the two. Radiation travelling down hollow leg 12a in a pure $TE_{10}$ mode has zero electric field at the channel and will not radiate any energy outside of hollow leg 12a. Thus, the only energy loss will be energy which is converted to other modes by discontinuities in hollow leg 12a or imperfections in horn 32. Since it takes relatively large irregularities in hollow leg 12a to convert any significant amount of energy to other modes, there is little loss (less than 2 db in 3 meters) in a crudely made device.

The microwave radiation propagates down hollow leg 12a until it encounters redirecting means 20a. Both redirecting means 20 are moving in hollow legs 12, but stay a predetermined distance ahead of leading edge 11 determined by the length of chains 27. The redirecting means 20a projects microwaves in a beam 30 across to redirecting means 20b. Redirecting means 20b then projects the beam 24 up hollow leg 12b towards detector 17. Thus, it can be seen that although beam 30 is moving with leading edge 11 of sliding gate 10, source 16 and detector 17 remain fixed in place.

So long as detector 17 detects microwaves, the receiver circuit 62 will send this information to microprocessor control system 46. When an object lying in the path of sliding gate 10 first comes between redirecting means 20a and 20b, the object blocks the passage of the microwaves. As soon as this occurs, detector 17 stops receiving microwaves. Assuming that microprocessor control system 46 has been properly programmed, the absence of a signal from receiver circuit 62 is interpreted to mean that an object is in the path of sliding gate 10. An alarm can then be sounded, a visual indication given, and the power supply to the gate motor (not shown) can be terminated so that sliding gate 10 stops immediately.

Figure 4:
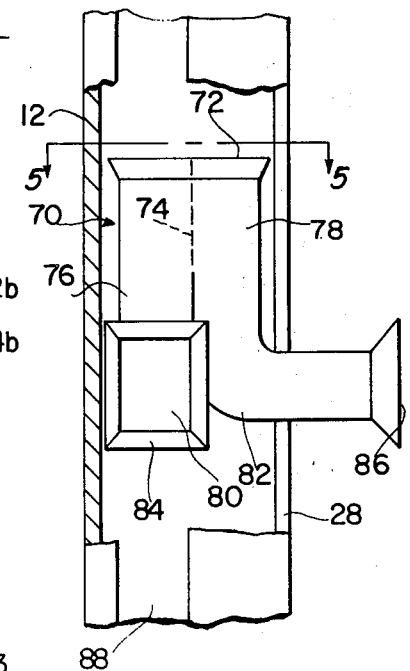
FIG. 4 is a schematic representation in partial section of a front elevational view of another embodiment of a redirecting means used in this invention.
Figure 5:
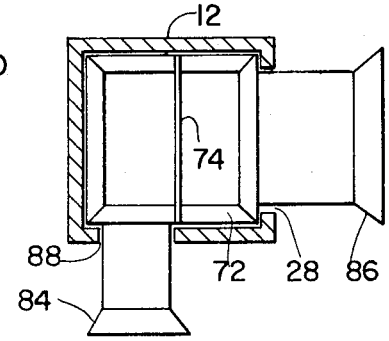
FIG. 5 is a cross-sectional view taken along line 5—5 of FIG. 4.

Another embodiment of this invention is depicted in FIGS. 4 and 5 which has a modified redirecting means 70. Modified redirecting means 70 is comprised of a single, conventional, receiving horn 72, a dividing plate 74 which separates redirecting means 70 into two wave guides 76 and 78 for splitting the received beam from horn 72 into two separate beams, two hollow elbows 80 and 82, and two conventional transmitting horns 84 and 86 respectively connected to the other ends of elbows 80 and 82. Thus the beam received by redirecting means 70 can be split and retransmitted thereby as two separate beams in completely different directions, such as orthogonally, as shown.

Modified redirecting means 70 are mounted for movement within hollow legs 12 in the same manner as previously described for redirecting means 20. In order to accommodate elbows 80 and 82, the hollow leg 12 has a channel 88 provided as shown, in addition to channel 28.

The separate beams transmitted from the separate wave guides 76 and 78 are directed towards two separate, similarly shaped receiving redirecting means 70. Acting as a receiver of radiation, the radiation enters either wave guide 76 or 78, depending on which one is positioned to receive the microwave beam. The microwave beam is then redirected up the other hollow leg 12 towards the detector 17 where it is detected as described above.

Figure 6:
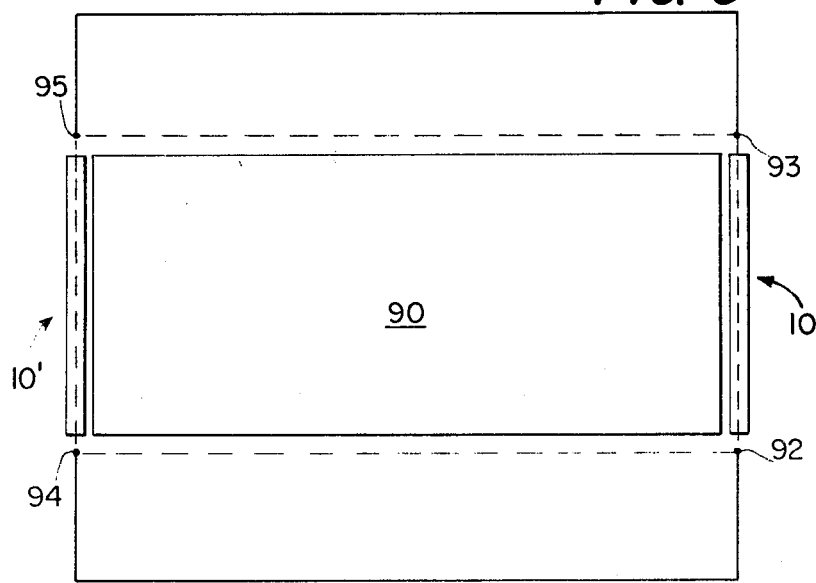
FIG. 6 is a schematic representation of a use of the alternative redirecting means in connection with the car pan of a car parking tower.

The operation of modified redirecting means 70 is illustrated in FIG. 6. While this system may be used in other types of mechanisms, it is pictured here with respect to a car parking elevator such as the one shown in U.S. Pat. No. 3,656,608 to Lichti incorporated herein by reference. Shown in FIG. 6 is a schematic top view of a car pan 90 on which a car to be transported is parked. Hollow legs 12 with modified redirectory means 70 are schematically represented by points 92, 93, 94 and 95. Two sliding gates 10 and 10' are provided at each end of car pan 90 (only shown schematically) between points 92 and 93 and between points 94 and 95. After a car has been loaded on car pan 90, it is necessary to know if the car is properly positioned and if the driver and passengers (if any) are out of the car where they might be in danger.

In this embodiment, the hollow legs at points 92 and 95 contain sources 16 of microwave radiation. The redirecting means 70 split the beam of microwave radiation emitted from each source 16. One half of the beam from the source 16 at point 92 is transmitted by wave guide 76 towards point 94, while the other half is transmitted by wave guide 78 towards point 93. In the same manner, two beams are transmitted from the source 16 at point 95 towards points 93 and 94. At points 93 and 94, corresponding wave guides of modified redirecting means 70 receive two beams and direct them towards the detector 17.

When operating, the microprocessor 36 is programmed to turn on only one source 16 at a time. Thus, when the source 16 at point 92 is emitting radiation, the detectors at points 93 and 94 detect radiation. If radiation is not detected, the microprocessor 36 is programmed to stop sliding gates 10 immediately. If radiation is detected, the source at point 92 would be turned off and the source at point 95 turned on. Again, microprocessor 36 is programmed to stop sliding gates 10 if radiation is not detected at both points 93 and 94. The alternate turning on and off of sources 16 at short intervals, such as from milliseconds to as long as one second, provides a plurality of checks being rapidly made for an object lying in the path of sliding gates 10 or lying alongside of car pan 90.

Although the invention has been described in detail with respect to exemplary embodiments thereof, it will be understood by those of ordinary skill in the art that variations and modifications may be effected within the scope and spirit of the invention. Thus, for example, the first aspect of the present invention relating to a sliding gate can be utilized with any type of moving object, especially including elevator doors, in which it is necessary to detect when an object lies in the path of a moving object. Such a system may or may not take advantage of a redirecting means which splits a beam into a number of separately propagated beams. In addition, although the present invention has been described in particularity with respect to microwaves, it should be obvious that other types of electromagnetic radiation can be utilized. Also, although the hollow legs were depicted as being parallel and vertical, they can be horizontal, angled, or non-parallel. Other variations and modifications of the present invention are also possible.

I claim:

1. An electromagnetic radiation detection system for detecting when an object is located in the path of a sliding gate that travels between two hollow legs, said system comprising:
    a source of electromagnetic radiation, fixed with respect to a first hollow leg and in communication therewith;
    a detector of electromagnetic radiation fixed with respect to a second hollow leg and in communication therewith;
    a sliding gate movable in a direction generally parallel to the legs;
    a first redirecting means slidable in the first leg for receiving the radiation emitted from said source and redirecting the radiation toward said second leg;
    a second redirecting means slidable in the second leg for receiving the radiation from said first redirecting means and redirecting the received radiation to said detector; and
    means for moving said first and second redirecting means in said first and second legs respectively upon movement of said sliding gate such that the radiation from said source is projected in a beam that travels ahead of the sliding gate when sliding.

2. An electromagnetic radiation detection system as claimed in claim 1 wherein
    said first and second redirecting means are maintained at a predetermined distance ahead of the leading edge of the sliding gate.

3. An electromagnetic radiation detection system as claimed in claim 2 further comprising
    a frame for guiding the movement of the sliding gate, and wherein
    said first and second legs are a part of said frame.

4. An electromagnetic radiation detection system as claimed in claim 1, wherein
    said source of electromagnetic radiation is a source of microwave radiation and
    said hollow legs are wave guides for the microwave radiation.

5. An electromagnetic radiation detection system as claimed in claim 4, wherein
    said first and second redirecting means comprise 90° bend wave guides.

6. An electromagnetic radiation detection system as claimed in claim 4, wherein
    said source of microwave radiation comprises a source of polarized radiation.

7. An electromagnetic radiation detection system as claimed in claim 1, wherein
    said moving means for said first and second redirecting means includes means for directly connecting said sliding gate and said first and said second redirecting means.

8. An electromagnetic radiation detection system as claimed in claim 6, wherein
    said connecting means comprise flexible chains.

9. An electromagnetic radiation detection system as claimed in claim 1, wherein
    said first redirecting means comprises means for splitting the source of radiation into two separate beams and for directing said beams to two separate detectors, one detector being in communication with said second hollow leg and the other detector being located outside the plane of said sliding gate, such that objects in the path of a sliding gate are detected and objects in another area are detected.

10. An electromagnetic radiation detection system as claimed in claim 1 and further comprising circuit means for controlling the generation and detection of said electromagnetic radiation.

11. An electromagnetic radiation detection system as claimed in claim 10 wherein said source generates microwave electromagnetic radiation and wherein said circuit means comprises:
    a control system for generating a microwave transmission signal, for detecting a microwave received signal, and for generating a control signal when said received signal is not detected,
    oscillator means coupled to said source for causing said source to generate microwave radiation, said oscillator means being controlled by said control system;
    modulator means for modulating said oscillator means; and amplifier means connected to said detector for amplifying the received radiation for generating a microwave received signal and for delivering said microwave received signal to said control system.

12. A method of detecting when an object is located in the path of a sliding gate using electromagnetic radiation, comprising the steps of:
   transmitting, from a position fixed relative to the sliding gate, electromagnetic radiation;
   redirecting said transmitted radiation along a path slightly ahead of the leading edge of the sliding gate and then again redirecting said radiation towards a detector; and
   detecting, from a position fixed relative to the sliding gate, said radiation;
   such that said radiation is normally detected, and such that when an object is located in the path of the sliding gate slightly ahead of the leading edge, said radiation is blocked.

13. A method of detecting when an object is located in the path of a sliding gate using electromagnetic radiation as claimed in claim 12, further comprising the steps of:
   redirecting said transmitted radiation essentially 90°; and
   moving both redirecting means with said sliding gate.

14. A method of detecting when an object is located in the path of a sliding gate using electromagnetic radiation as claimed in claim 12, further comprising the steps of:
   splitting said transmitted radiation into two separate beams;
   redirecting one beam along a path slightly ahead of the leading edge of the sliding gate and then again redirecting said one beam towards a first detector;
   detecting said one beam from a position fixed relative to the sliding gate;
   redirecting the other beam along a path at an angle to said first beam and out of the plane of the sliding gate;
   detecting said other beam with a second detector.

15. A method of detecting when an object is located in the path of a sliding gate using electromagnetic radiation as claimed in claim 12 and further comprising controlling the generation of said electromagnetic radiation with a control means and coordinating the operation of said detector with the generation of said electromagnetic radiation.

16. A method of detecting when an object is located in the path of a sliding gate using electromagnetic radiation as claimed in claim 15 and further comprising modulating the generation of said electromagnetic radiation such that a modulated electromagnetic radiation is generated.

* * * * *